(12) United States Patent
Nakamura et al.

(10) Patent No.: US 6,414,410 B1
(45) Date of Patent: Jul. 2, 2002

(54) ROTARY ELECTRIC MACHINE HAVING REDUCED WINDING

(75) Inventors: Shigenobu Nakamura, Anjo; Atsushi Umeda, Okazaki, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/599,422

(22) Filed: Jun. 22, 2000

(30) Foreign Application Priority Data

Jun. 25, 1999 (JP) .......................................... 11-179916
Nov. 29, 1999 (JP) .......................................... 11-337645

(51) Int. Cl.[7] .................................................. H02K 3/00
(52) U.S. Cl. ..................... 310/179; 310/201; 310/208
(58) Field of Search ........................ 310/254, 214, 310/216, 42, 179, 184, 198, 208, 201, 215, 206; 29/596–598, 605–606

(56) References Cited

U.S. PATENT DOCUMENTS 5,723,930 A * 3/1998 Ho et al. ..................... 310/179
5,982,068 A * 11/1999 Umeda et al. ............... 310/206
5,986,375 A * 11/1999 Umeda et al. ............... 310/180
6,137,201 A * 10/2000 Umeda et al. ............... 310/201

FOREIGN PATENT DOCUMENTS

WO    WO98/54823    12/1998

* cited by examiner

*Primary Examiner*—Tran Nguyen
(74) *Attorney, Agent, or Firm*—Oliff & Berridge, PLC

(57) ABSTRACT

A stator core of rotary electric machine has a plurality of slots. The slots are fully occupied by a stator winding to provide maximum output. On the other hand, to provide reduced output, empty unused slots are located alternately along a circumferential direction. The stator winding is only accommodated in the fully occupied slots. Therefore, rotary electric machines having different performances are provided without a drastic design change of the stator core.

18 Claims, 16 Drawing Sheets

ROTARY ELECTRIC MACHINE HAVING REDUCED WINDING

CROSS REFERENCE TO RELATED APPLICATION

This application is based on Japanese Patent Application No.Hei 11-179916 filed on Jun. 25, 1999 and No.Hei 11-337645 filed on November 29, the contents of which are incorporated herein by reference.

BACKGROUND OF THE INVENTION

1. Field of the Invention

The present invention relates to a rotary electric machine and a method for making the same, and particularly to a rotary electric machine for an AC generator driven by an engine mounted on a vehicle, such as a passenger car, truck or vessel.

2. Description of Related Art

WO98/54823 discloses a stator for a vehicle AC generator having a stator winding which is assembled by connecting opposite ends of a plurality of conductor segments. These conductor segments are inserted into slots which are axially extended along the stator core. At the coil ends of the stator, the segments form a regularly inclined pattern on each layer so that a collision of the segments at the coil ends is avoided. Such a stator is designed for increasing the output power based on reducing heat loss in the stator winding and improving the slot-space factor (the ratio of the conductors to the cross-sectional area of the slot).

On the other hand, in a conventional rotary electric machine, such as disclosed in WO98/54823, several factors, such as the number of turn of the winding, the inside diameter D of the stator core and the axial length L of the stator core, are defined based on the required performances, such as an output voltage and a starting speed.

However, vehicles are produced in several different varieties, such that engine capacity and an assumed electric load are variable. Accordingly, the AC generators for vehicles are designed for several different specifications in accordance with these varieties. Therefore, manufacturers are required to produce each different stator in accordance with these variables, and to produce corresponding adaptive rotors and frames. It is further required to design the adaptive manufacturing machines and the specifications on the basis of the required performance.

SUMMARY OF THE INVENTION

The present invention addresses these drawbacks by providing an improved stator arrangement.

It is therefore an object of this invention to provide a rotary electric machine which has a reduced number of stator windings and method for making the same.

It is a further object of this invention to provide a rotary electric machine which accommodates the electric conductors only in a part of the slots and method for making the same.

It is another object of this invention to provide a rotary electric machine which accommodates the electric conductors in the slot less than the electric conductors primarily permissible to disposed in a slot.

It is a still further object of this invention to improve a cooling efficiency of the stator.

It is a yet further object of this invention to provide a rotary electric machine adaptable to a plurality of required performances and method for making the same.

It is still another object of this invention to provide a rotary electric machine adaptable to a plurality of required performances and to change these required performances in the future and to provide a method for making the same.

According to a first aspect of the present invention, a stator has at least one unused slot and a slot having an unused layer. The present invention provides a stator winding having a reduced number of turns or a reduced cross-sectional area. For instance, it is possible to provide two or more output types of the AC generators using common stators.

The unused slot and the unused layer may provide the cooling medium passages to improve a cooling efficiency of the stator. On the other hand, the unused slot and the unused layer may be plugged in order to provide highly rigidity.

The stator winding is preferably forms of a plurality of U-shaped conductor segments. This configuration provides an advantageous manufacturing process.

According to an another aspect of the present invention, a stator core is provided having a plurality of base slots and a plurality of reserve slots. Additionally, the base slots define base teeth between adjacent two of them. Each of the base teeth has a circumferential width. The width is still enough to form the reserve slot andareserve teeth, even if the base tooth includes one or more reserve slots which is same as the base slot. The reserve teeth are located on both sides of the reserve slots. In this configuration, it is possible to increase the variety of outputs by changing the manufacturing equipment only a little. The reserve slots include both actually formed slots and imaginary slots.

According to an another aspect of the present invention, the stator has a first slot in which the stator winding is accommodated and a second slot in which the stator winding is not accommodated. The present invention provides a stator winding having a reduced number of turns or a reduced cross-sectional area. For instance, it is possible to provide two or more output types of the AC generators using common stators.

According to another object of the present invention, a method for manufacturing the AC generator for vehicle includes a step for positioning the stator winding with a plurality of used slots to reserve a plurality of empty slots as the reserve slots.

Other features and advantages of the present invention will be appreciated, as well as methods of operation and the function of the related parts, from a study of the following detailed description, the appended claims, and the drawings, all of which form a part of this application.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

Figure 1:
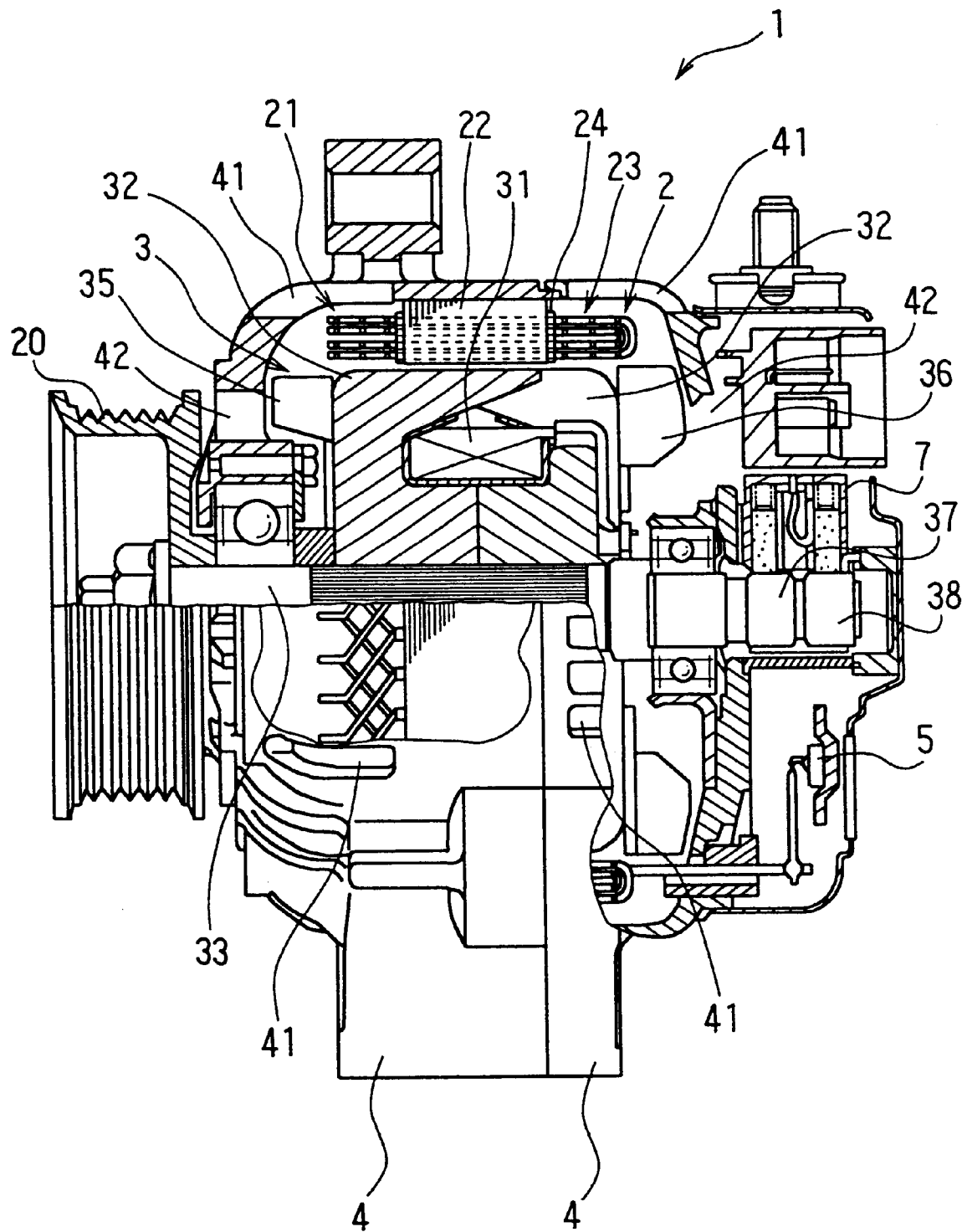
FIG. 1 is a sectional view of a vehicular AC generator according to the present invention.

FIG. 1 is a sectional view of a vehicular AC generator of a first embodiment. The vehicular AC generator 1 has a cylindrical stator 2, a rotor 3 disposed inside the stator 2, frames 4 in which the stator 2 and the rotor 3 are supported, and a rectifier 5.

The stator 2 comprises a stator core 22, a plurality of conductor segments 23 which forms stator winding 21 and insulators 24. The insulators 24 insulates between the stator core 22 and each of the conductor segments 23. The stator core 22 is assembled as a laminated core which is assembled to stack a plurality of laminate steel sheets having a predetermined thickness. The stator core 22 has a plurality of slots which is formed by penetrating the laminated steel sheets. The insulator 24 is a sheet made of an electrical insulating resinous material. The stator winding 21 is a three phase stator winding, referred to as a poly-phase stator winding. The stator winding 21 will be explained later in greater detail.

The rotor 3 has a field coil 31 made of the cylindrically and coaxially coiled copper wire which is coated with an insulating material. The field coil 31 is clamped between both sides by pole cores 32 each having six claw poles. A shaft 33 passes through them. A cooling fan 35, for discharging a cooling wind introduced from front side of the generator 1, is fixed on the end surface of the front pole core 32 by welding. In the same manner, a cooling fan 36, for discharging a cooling wind introduced from rear side of the generator 1, is fixed on the end surface of the rear pole core 32 by welding. Slip rings 37 and 38 connected to either ends of the field coil 31 are disposed on the rear end of the shaft 33. A brush device 7 supplying electric power to the slip rings 37 and 38 is disposed on the frame 4. The field coil 31 is energized through the slip rings 37 and 38 and the brush device 7.

The frame 4 accommodates the stator 2 and the rotor 3. The rotor 3 is rotatable supported on the shaft 33 as a rotating center by the frame 4. The frame 4 provides cooling air passages for the cooling air which cools the coil ends of the stator coil 21 extended from axial ends of the stator core 22. The frame 4 has a plurality of discharge windows 41. Each windows 41 is formed on the peripheral wall of the frame 4 and is located on a radial outside of the coil ends. A plurality of intake windows 42 is located on the axial end walls of the frame 4.

A rotational movement of an engine is transmitted to a pulley 20 by a belt. The pulley 20 rotates with the rotor 3 in a predetermined direction. In this situation, energizing voltage is supplied from an external source to the field coil 31 of the rotor 3. The current flowing through the field coil energizes the respective claw poles of the pole core 32. As a result, N and S magnetic poles are generated alternately along the rotational circumferential direction of the rotor 3. The magnetic flux from the rotor 3 passes through the stator 2, and induces three-phase AC voltage on the stator winding 21. The rectifier 5 rectifies the three-phase AC voltage. Then, a DC output voltage is provided to an output terminal of the rectifier 5.

Figure 2:
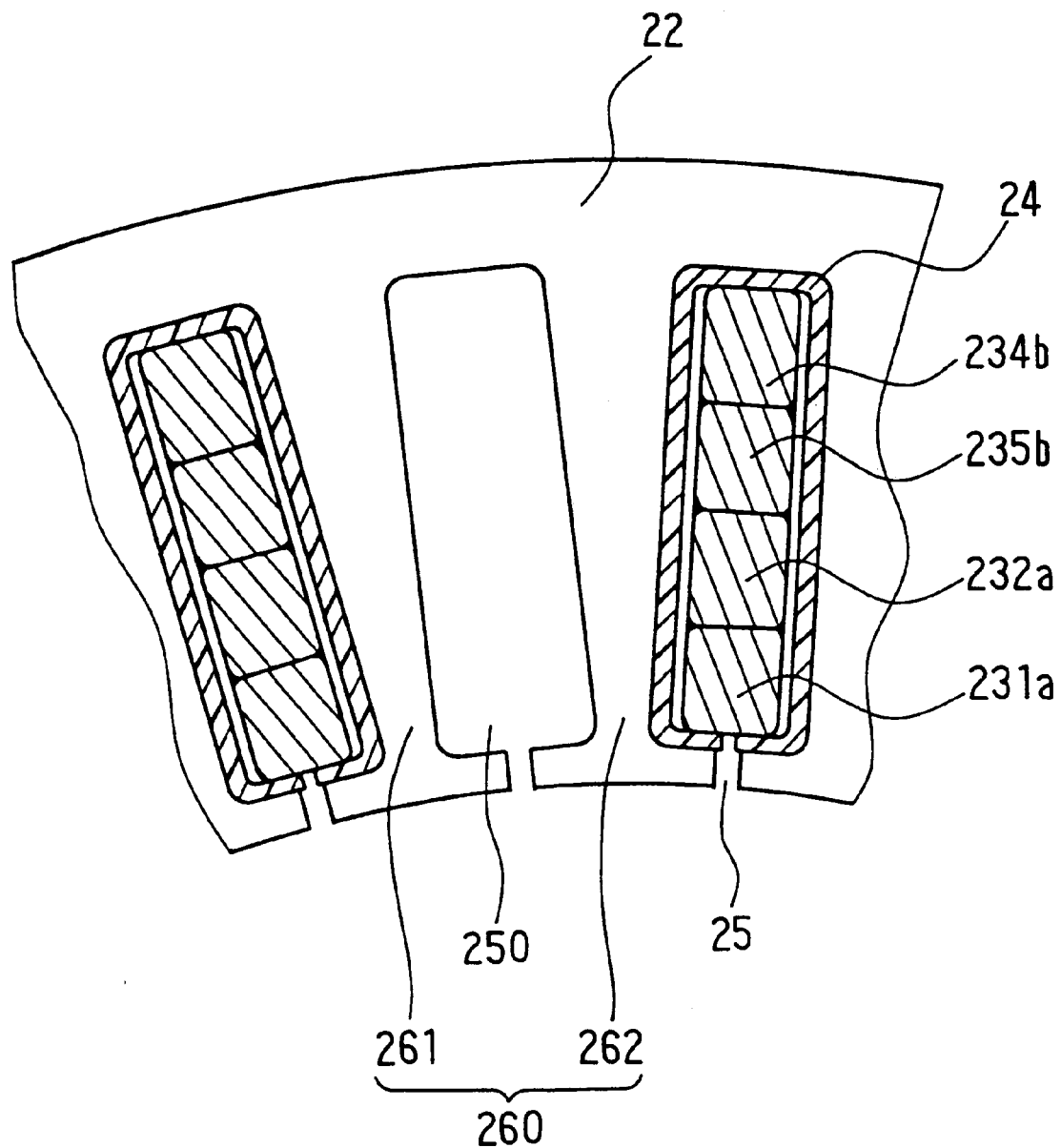
FIG. 2 is a partial cross sectional view of a stator according to a first embodiment of the present invention.

Next, the stator 2 is described in detail. FIG. 2 is a partial cross sectional view of the stator 2. As shown in FIG. 2, the stator 22 has a plurality of slots 25 and 250 disposed alternately along the rotational circumferential direction. A plurality of electric conductor segments constituting the poly-phase stator winding 21 is accommodated in the slots 25. The slots are referred to as first slots. The slots 25 accommodating the stator winding 21 described above are called as base slots. In this embodiment, 36 base slots 25 are provided. The base slots 25 are disposed at equal intervals so that the base slots 25 accommodate the three-phase of the stator winding 21 in accordance with the number of the magnetic poles of the rotor 3. The entire portion of the adjacent base slots 25 constitutes a base tooth 260.

Additionally, the slots 250, called the second slots are empty and unused slots which do not accommodate the stator winding 21. The slots 250 are called as reserve slots. The reserve slots 250 are disposed in the base teeth 260. Two teeth 261 and 262 are reserve teeth, formed on both sides of the reserve slot 250 located on the base teeth.

The slots 250 have open ends on both of axial sides. The slots 250 also have an open slit on a radial inside. In this embodiment, a pressure difference is generated on the both axial ends of the slots 250 by providing a difference between fan capacities of the cooling fan 35 and cooling fan 36 or the like. Therefore, the wind flows axially in the slots 250. The cooling wind is used as a cooling medium and is introduced into the slots 250.

As a result, the stator in the present invention is equipped with the stator winding 21 only in the base slots 25, which is a half of 72 total slots. The reserve slots 250 are located at every second on the stator core 22. These reserve slots 250 are removed from a purpose of accommodating the stator winding 21. Further, portions defined between two adjacent base slots are referred to as base teeth. Each of the base teeth has an enough circumferential width. The base tooth can still include the reserve teeth on both sides of the reserve slot, even if one or more reserve slots are located on the base tooth. The reserve slot is the same as the base slot. Accordingly, the necessary cross sectional area for the magnetic flux path is maintained. Further, the aforementioned slot is defined as a slot having a cross sectional area in which the plurality of the conductor segments constituting the stator winding 21 can be accommodated, and is defined not including a gap like a slit.

The slots 25 accommodate an even number of electric conductors (four conductors in this embodiment) which are isolated from each other. As shown in FIG. 2, the four electric conductors are aligned in order of an innermost layer, an inner middle layer, an outer middle layer and an outer most layer in a radial direction of the stator core 22. The electric conductors may be arranged in two rows in the slot.

Figure 3:
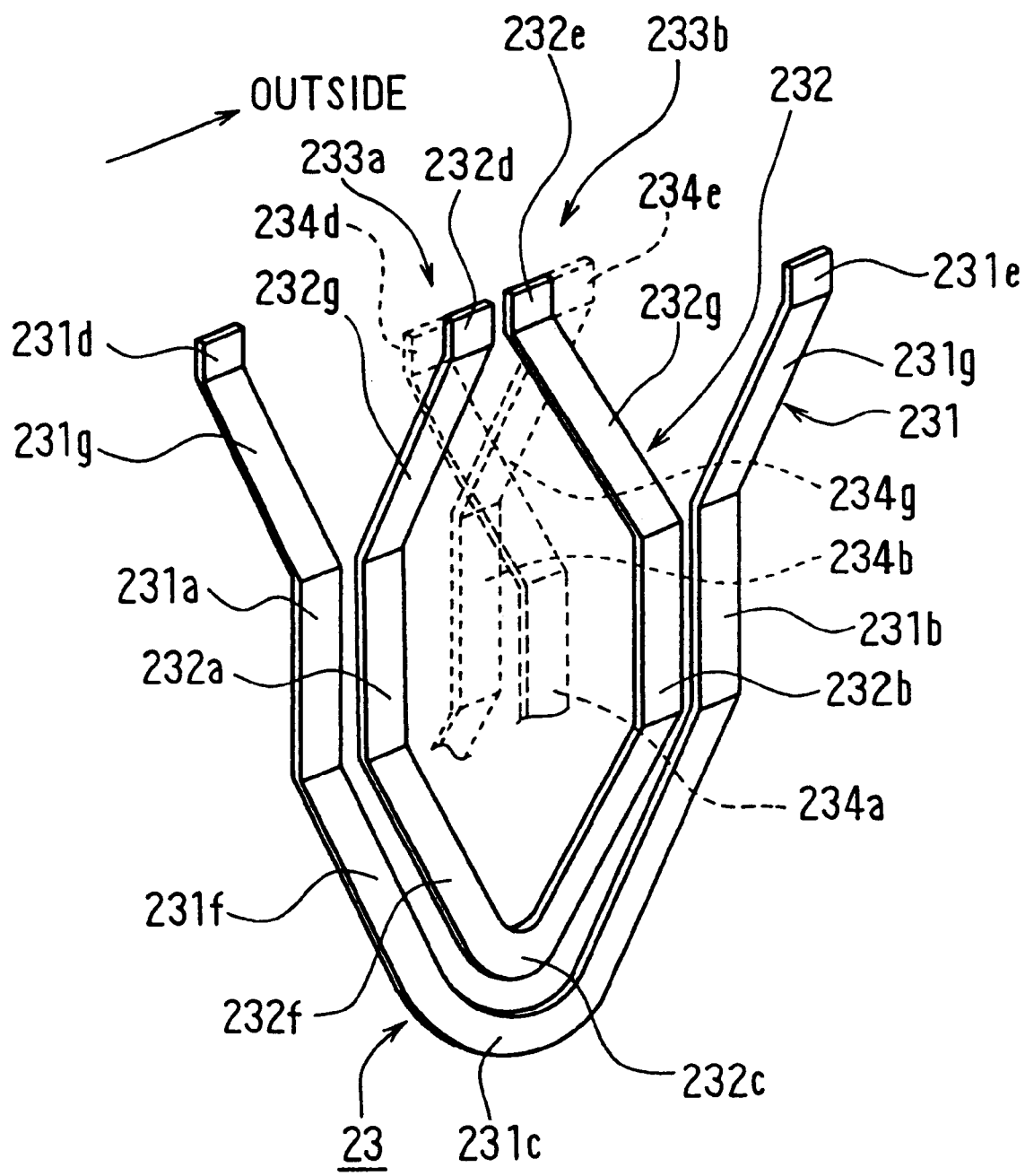
FIG. 3 is a perspective view of a conductor segment according to the first embodiment of the,present invention.

In this embodiment, the electric conductors accommodated in the slots are provided by a plurality of conductor segments 23. The electric conductor 231a in the inner most layer disposed in a first slot of the slots 25 is paired with the electric conductor 231b in the outer most layer disposed in a second slot of the slots 25. As shown in FIG. 3, the second slot 25 is spaced one magnetic pole pitch in the clockwise direction apart from the first slot. The electric conductors 231a and 231b are connected via the turn portion 231c on a first axial end of the stator core 22. In the same manner, the electric conductor 232a in the inner middle layer disposed in a first slot of the slots 25 is paired with the electric conductor 232b in the outer middle layer disposed in a second slot of the slots 25. The second slot 25 is spaced one magnetic pole pitch in the clockwise direction apart from the first slot. The paired electric conductors 232a and 232b are connected via the turn portion 232c on the first axial end of the stator core 22.

Therefore, on the first axial end of the stator core 22, two types of the turn portions are provided. A large turn portion 231c is the continuous wire connecting the electric conductor 231b in the outer most layer and the electric conductor 231a in the innermost layer. A small turn portion 232c is the continuous wire connecting the electric conductor 232b in the outer middle layer and the electric conductor 232a in the inner middle layer. The turn portion 232c is surrounded by another turn portion 231c of the electric conductor accommodated in the same slot 25. The connection formed between the electric conductor 232a in the inner middle layer and the electric conductor 232b in the outer middle layer provides an inner layer coil end. The connection formed between the electric conductor 231a in the inner most layer and the electric conductor 231b in the outer most layer provides an outer layer coil end.

The electric conductor 232a in the inner middle layer of the first slot is also paired with the electric conductor 234a in the inner most layer of the second slot. The second slot is spaced one magnetic pole pitch in the clockwise direction apart from the first slot. The electric conductors 232a and 234a are connected by joining at a second axial end of the stator core 22. In the same manner, the electric conductor 234b in the outer most layer of the first slot is also paired with the electric conductor 232b in the outer middle layer of the second slot. The second slot is spaced one magnetic pole pitch in the clockwise direction apart from the first slot. The electric conductors 234b and 232b are connected by joining at the second axial end of the stator core 22.

Therefore, a plurality of inner joints 233a and a plurality of outer joints 233b are disposed side by side at the second end of the stator core 22. The inner joint 233a joins the electric conductor 234a in the inner most layer and the electric conductor 232a in the inner middle layer. The outer joint 233b joins the electric conductor 234b in the outer most layer and the electric conductor 232b in the outer middle layer. Two types of adjacent layer coil ends are disposed on coaxial circles respectively. The first type is formed by the connection between the electric conductor 234b in the outer most layer and the electric conductor 232b in the outer middle layer. The second type is formed by the connection between the electric conductor 234a in the inner most layer and the electric conductor 232a in the inner middle layer.

As shown in FIG. 3, the electric-conductor 231a in the inner most layer and the electric conductor 231b in the outer most layer are provided by a large segment 231. The large segment 231 is made of a continuous wire processed into substantially U-shape. The electric conductor 232a in the inner middle layer and the electric conductor 232b in the outer middle layer are provided by a small segment 232. The small segment 232 is made of a continuous wire processed into substantially U-shape. The large segment 231 and the small segment 232 form a U-shaped segment set 23 referred to as a base segment. Each of the segments 231 and 232 has axially extending portions which are accommodated in the slots 25. Each of the segments 231 and 232 has inclined portions 231f, 231g, 232f and 232g; which are inclined predetermined angle relative to the axial direction. The inclined portions form the coil ends extended from both axial ends of the stator core 22. The passageways of cooling wind are mainly provided between the inclined portions. The above-mentioned construction is repeated on the plurality of slots 25 except for a few of slots for providing lead wires. As a result, the stator winding formed by a lap winding is provided.

Figure 4:
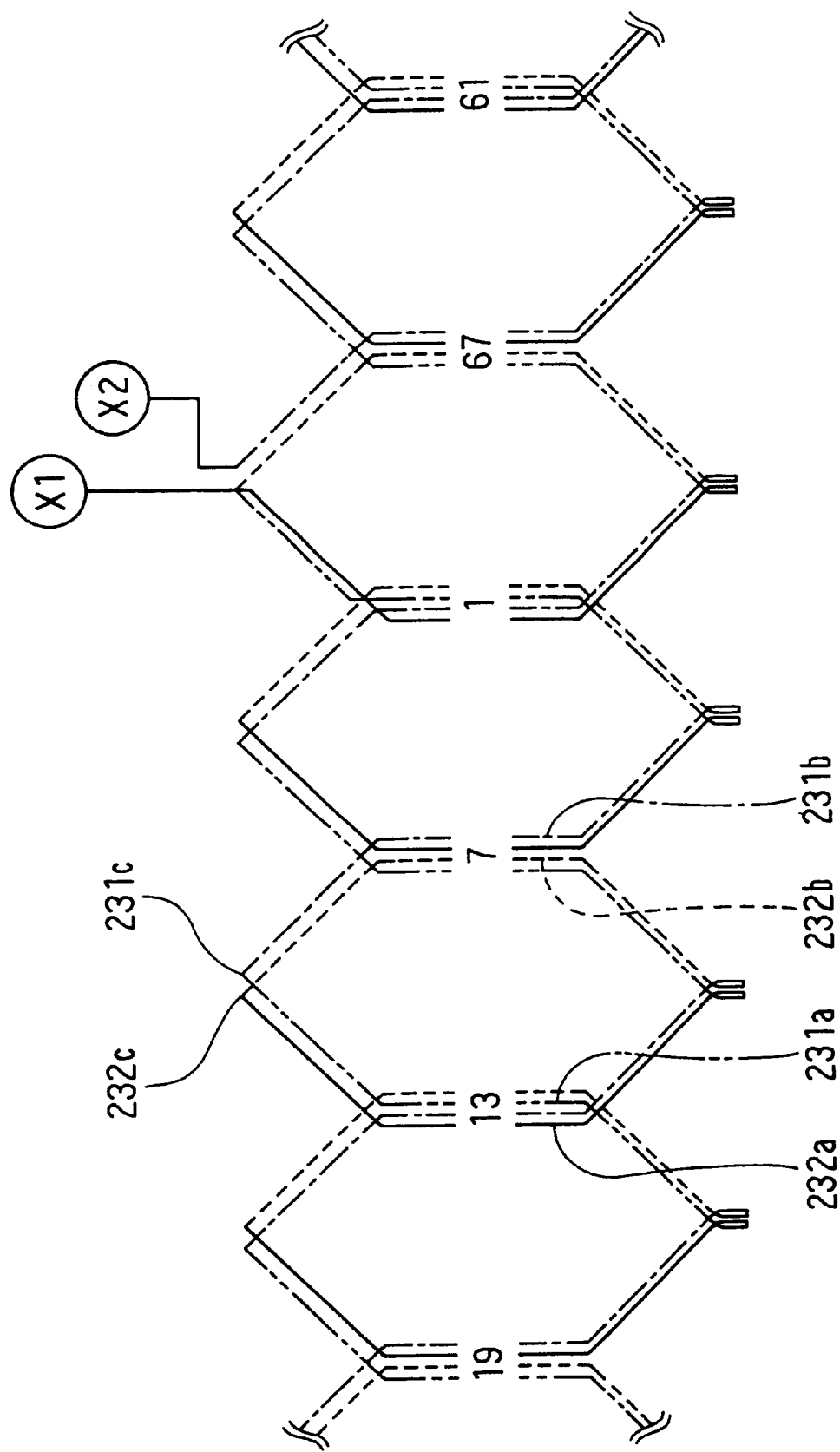
FIG. 4 is a wiring diagram of a stator winding on a stator core according to the first embodiment of the present invention.

FIG. 4 is a winding diagram of the stator winding. It shows a winding diagram of X phase of tree phases (X, Y, Z). The X phase is disposed in slots 25 numbered #1, #7 . . . #67. The electric conductors 231b in the outer most layers are represented by chain-lines. The electric conductors 232b in the outer middle layers are represented by a dashed-lines. The electric conductors 232a in the inner middle layers are represented by a continuous lines. The electric conductors 231a in the inner most layers are represented by a chain-double-dashed-lines. As shown in FIG. 4, specific-shaped segments for providing lead wires X1, X2 are disposed in the slot #1 and #67. In this embodiment, the specific shaped segments include U-type specific-shaped segments and I-type specific-shaped segments. In this embodiment, slots #1 to #72 are formed, #1, #3, #5, #7, . . . #69, #71 are the used slots 25, and #2, #4, #6, #8, . . . #70, #72 are the unused slots 250. The Y-phase shifted in electric angle 120 degree is disposed in #3, #9, . . . #69. The Z-phase further shifted in electric angle 120 degree is disposed in #5, #11, . . . #71.

Figure 5:
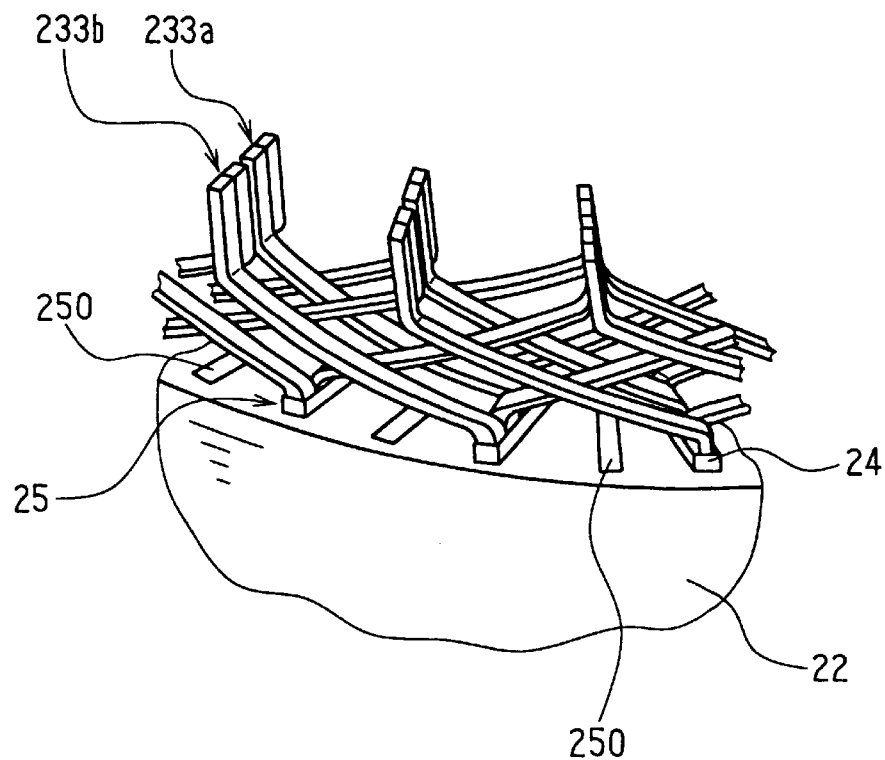
FIG. 5 is a perspective view of a part of a connection side of a stator showing a coil end of conductor segments according to the first embodiment of the present invention.

FIG. 5 is a perspective view showing the stator core in which the conductor segments are disposed. As shown in FIG. 5, each of the conductor segments is disposed in every second slots 25, and joined at the outer joints 233b and the inner joints 233a. As a result, the stator core 22 is cooled by arrangement of the empty slots 250 exclusively used for a passage of the wind. Therefore, the stator 2 applied for the vehicle AC generator of the present embodiment can improve the cooling efficiency of the stator winding 21 disposed in the slots 25. Accordingly, it is possible to produce the vehicle AC generator with a decreased output easily by decreasing a winding number relative to a case that the stator winding 21 is positioned in all of the slots 25 and 250. Additionally a decreasing amount of the output can be suppressed relative to a conventional continuous wire winding. It is possible to dispose the stator winding 21 in all of the slots 25 and 250 by using the common stator cores 22. Therefore, it is possible to expand varieties of the output without changing the equipment for assembling and the manufacturing process of the stator core 22 or the other parts adapted to it.

Figure 6:
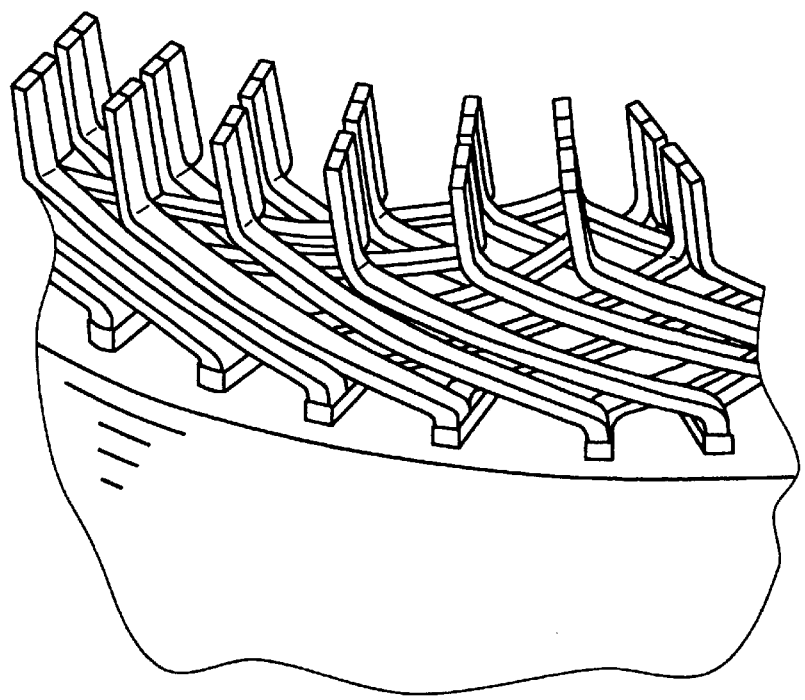
FIG. 6 is a perspective view of a part of a stator equipped with a plurality of conductor segments in a plurality of slots.

The slots 25 and the slots 250 are alternately disposed to prevent a partial temperature raising of the stator winding 21 in the slots 25. Therefore, it is possible to cool down the stator winding 21 equally and stably. The stator winding 21 is formed by the conductor segments 23, which allows to improve the cooling efficiency by simplifying a process to form gaps between the conductor segments 23 at the coil ends of the stator winding 21. Therefore, it is possible to cool down the entire portion of the stator winding 21 disposed on an inside and an outside of the slots 25 effectively. As shown in FIG. 2, the cross sectional area of the four electric conductors accommodated in the slots 25 are formed substantially rectangular shape which lies along the shape of the slots 25. It is possible to provide a good heat conductivity from each electric conductors to the inner wall of the slots 25, because the cross sectional shape of the electric conductors have parallel surfaces along the inner wall of the slots 25. Therefore, it is possible to provide further improvement of the cooling efficiency of the stator winding 21, combining the existence of the slots 250 in which the cooling wind pass through. The slots 25 used as the base slots and the slots 250 used as the reserve slots on the stator core 22 are formed as the same shape. Therefore, it is possible to manufacture the vehicle AC generator having a plurality of outputs only changing the winding specifications of the stator winding 21. Namely, it is possible to accept a manufacturing method that includes selecting step in which a type of stator winding is selected from two types and positioning step in which the selected type of the stator winding is positioned on the stator core. Therefore, it is possible to manufacture the two types of the stators selectively, such as the stator 2 equipped with the stator winding in the every second slots 25 as shown in FIG. 5 and the stator equipped with the stator winding in all of the slots as shown in FIG. 6. As a result, it is possible to adapt to a plural required performances or changing the required performance in the future without changing the stator core 22. Additionally, it is possible to prevent an addition of new equipment, and it is not necessary to change the equipment for manufacturing or assembling the stator core, because a design change for the stator core is not necessary.

Figure 7:
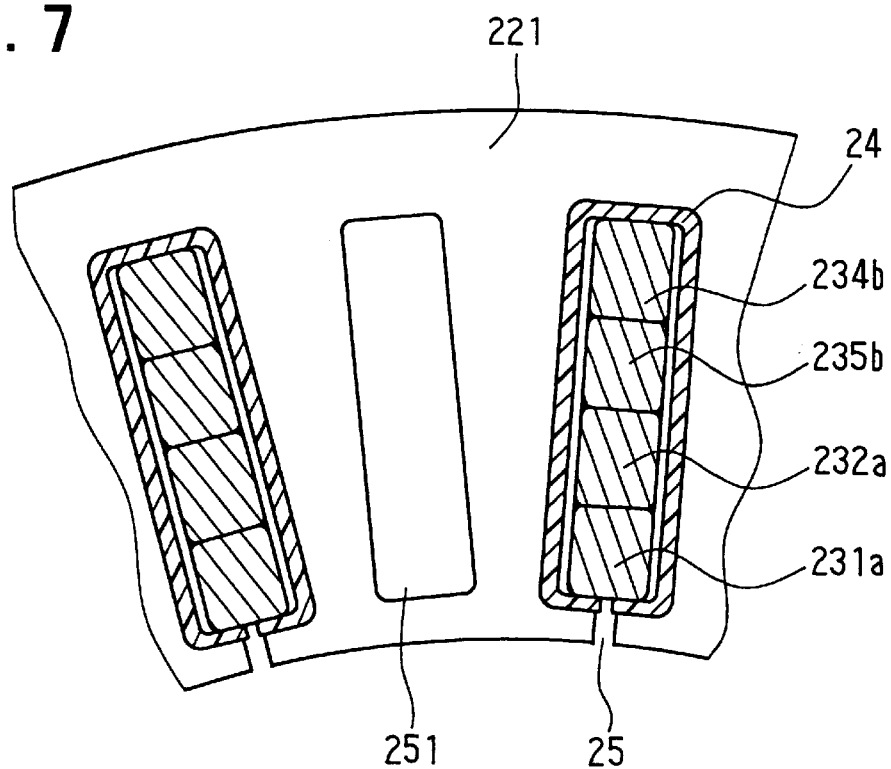
FIG. 7 is a sectional view of a part of a stator according to a second embodiment of the present invention.

As shown in FIG. 7, empty slots 251 having no inside-openings may be used as the reserve slots instead of the empty slots shown in FIG. 2. In this case, it is possible to introduce more magnetic flux into the stator by increasing the inside surface area of the stator core 221 facing to the outer surface of the rotor 3. It also enables to pass the cooling wind through the slots 251 axially. Therefore, it is possible to expand varieties taking further increase of the output. Particularly, it is possible to change between a plurality of different output types by only a little changing the equipment, because it only takes a little changing on the shape of the stator core 22. In this structure, it is necessary to change the forming die of the stator core.

Figure 8:
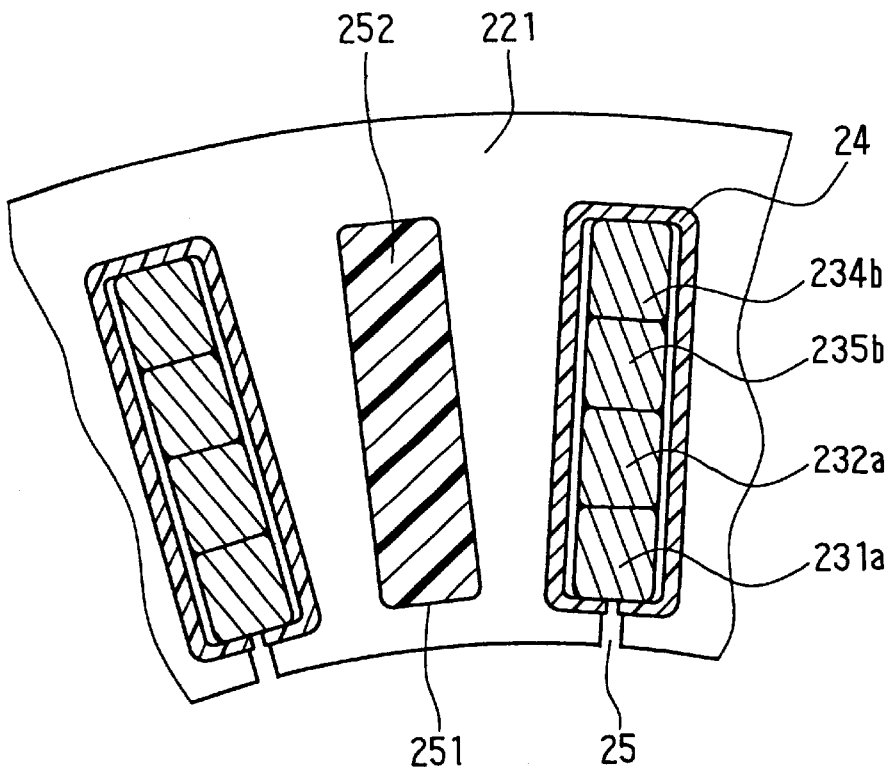
FIG. 8 is a sectional view of a part of a stator according to a third embodiment of the present invention.

As shown in FIG. 8, a plug member 252 made of an insulating resin or the like may be used for plugging the slots 251. Therefore, the axial ends of the slots 251 are plugged, and it is prevented to enter the cooling air. Therefore, it is possible to increase the rigidity of the stator core 221, and to decrease a magnetic noise generated by a vibration of the stator 2 when it is generating. In this construction, a manufacturing step for plugging the resin is added.

Figure 9:
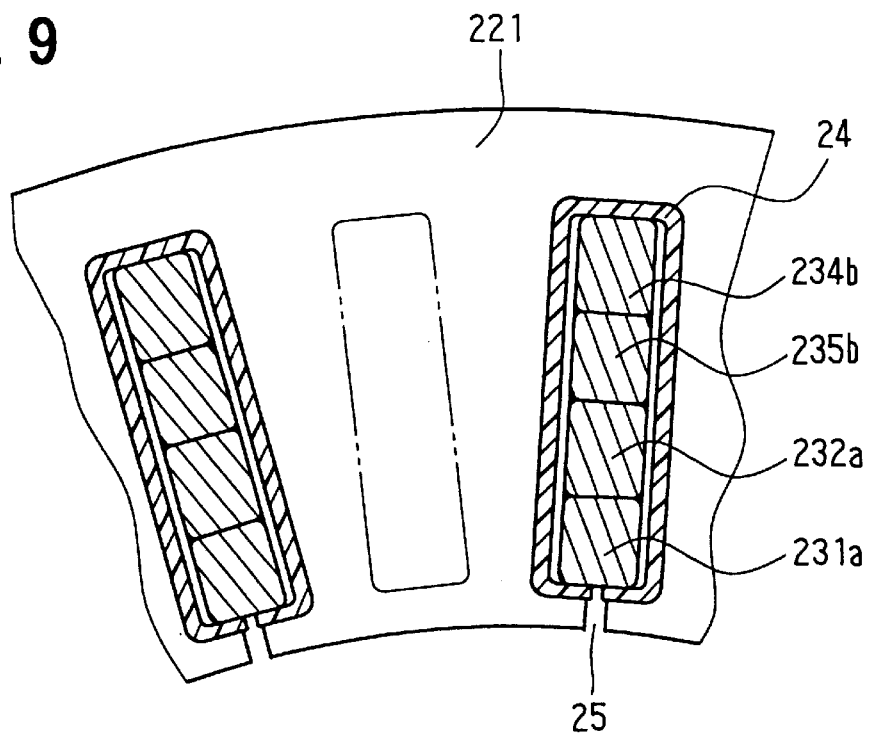
FIG. 9 is a sectional view of a part of a stator according to a fourth embodiment of the present invention.

As shown in FIG. 9, it is possible to use a construction disposing only the base teeth 260 having a width which enables to form the reserve slot thereon. Only the base slots are formed by plugging the slots 251 in FIG. 7 with the material of the stator core 22. Namely, the reserve slots also include imaginary slots which are not disposed actually in addition to the slots actually having the inside space thereon and the slots forming with the plugging member in the inside space. The base slots including the imaginary slots provides the base teeth having a wider width in the rotational circumferential direction. It enables to increase the inner circumferential area of the stator core facing the outer circumference of the rotor 3 and to decrease the magnetic resistance in the stator core. Therefore, it is possible to suppress the reduction of the output by decreasing the winding number and to expand output varieties. In this construction, it is necessary to change the forming die.

Figure 10:
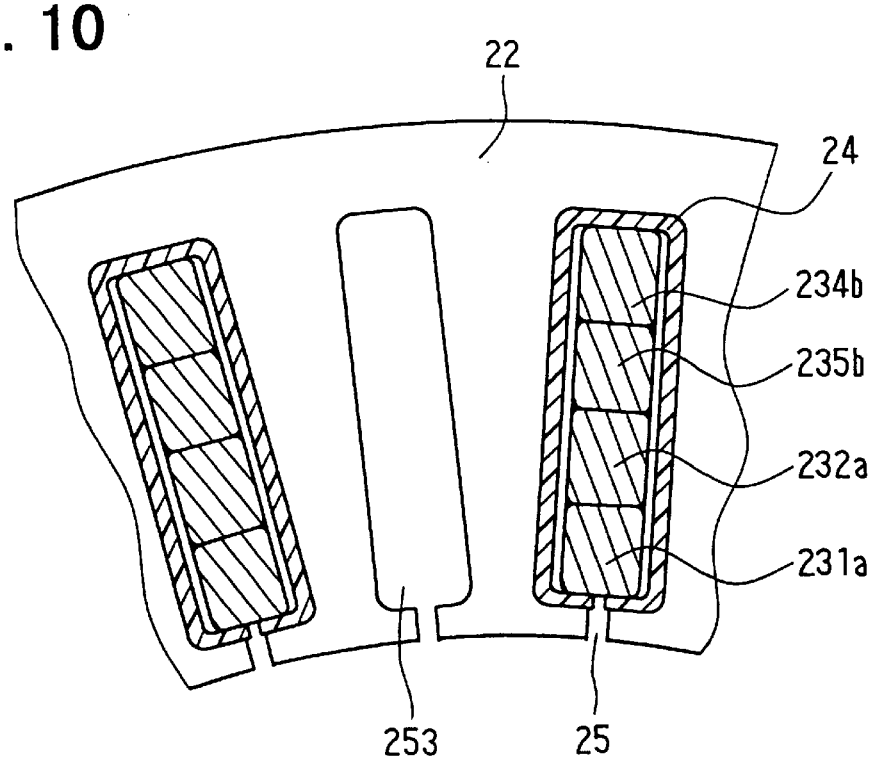
FIG. 10 is a sectional view of a part of a stator according to a fifth embodiment of the present invention.

As shown in FIG. 10, unused slots 253 having a narrower width along a rotational circumferential direction than the slots 25 may be used. In this case, it is possible to introduce more magnetic flux into the stator, as same as the case using the slots 251 described above, because the area of the magnetic flux path in the stator core 22 is enlarged. Therefore, it is possible to expand output varieties easily by a simple method only for changing the forming die of the slots 253 a little. In the above-mentioned embodiment, changing the stator 2 is only considered into expanding the output varieties. However, the specifications of the rotor 3 may be simultaneously changed with the shape of the stator core 22, the winding specifications of the stator winding 21 or the like. For instance, the number of the magnetic poles may be changed to change the magnetic pole-pitch according to the required performance with the changing of the stator 2.

Figure 11:
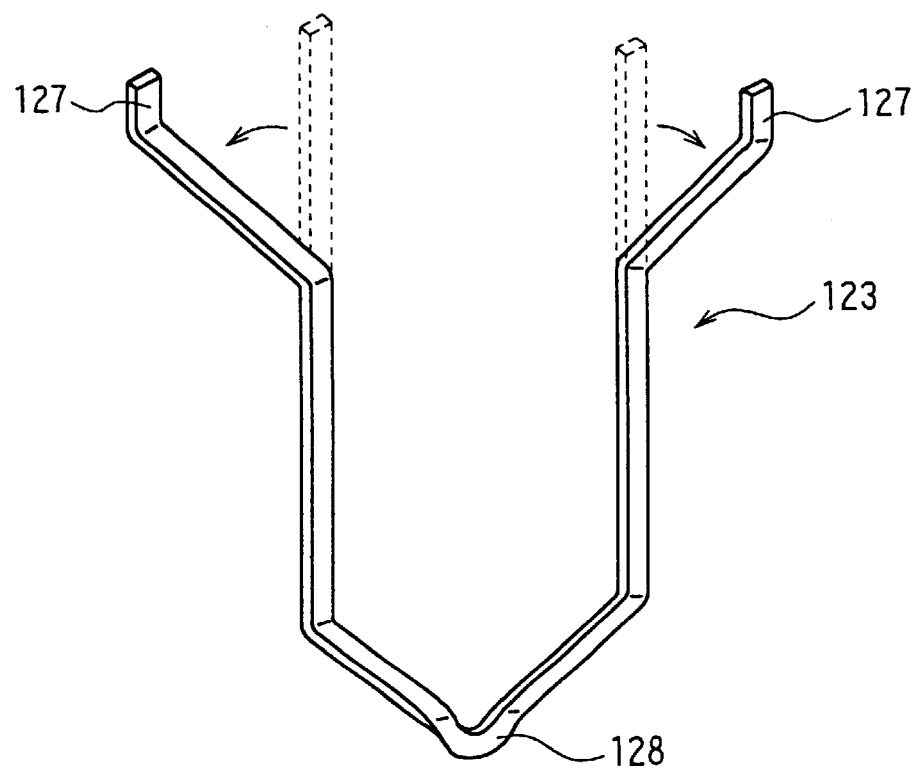
FIG. 11 is a perspective view of a conductor segment according to a sixth embodiment of the present invention.
Figure 12:
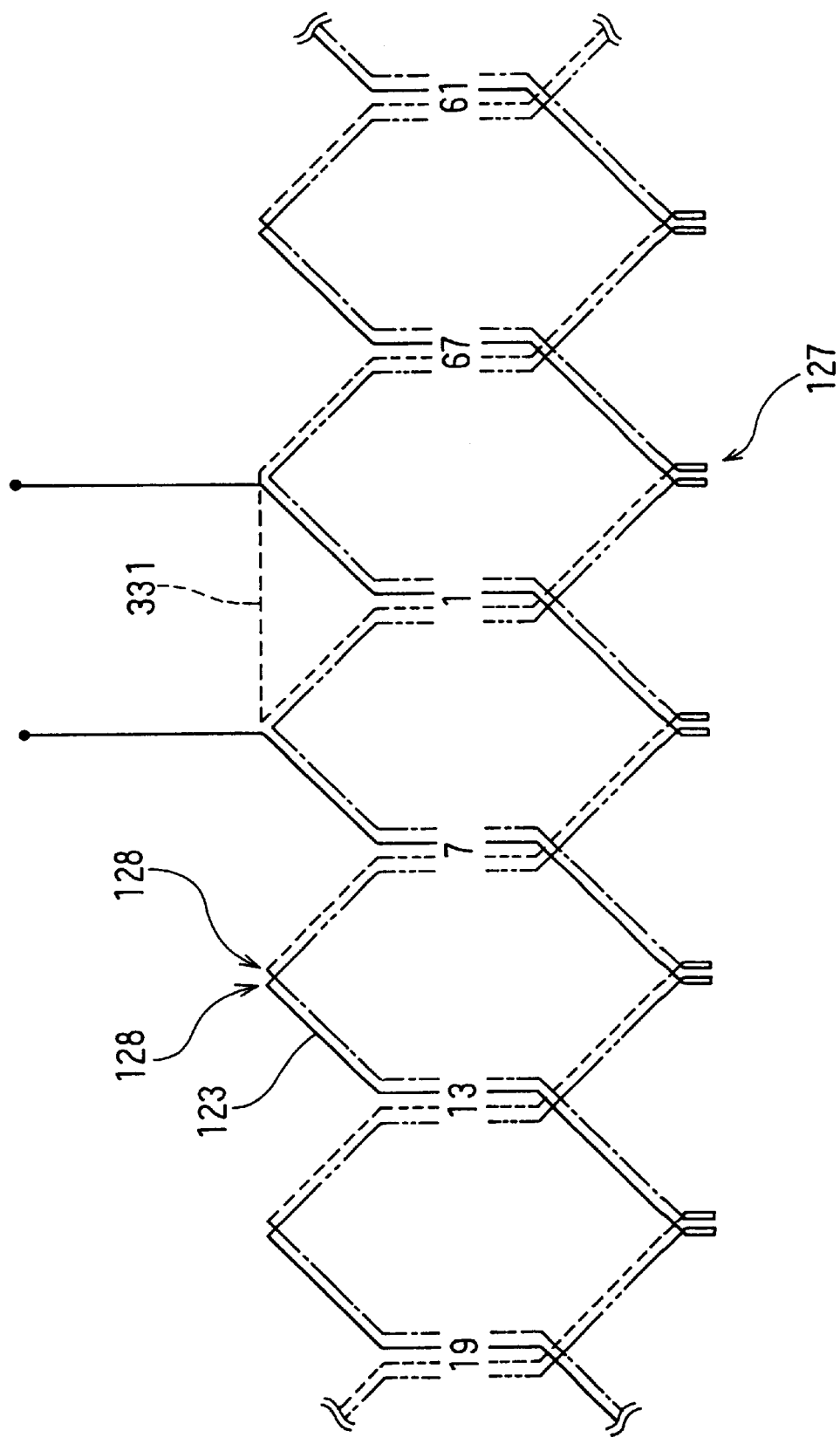
FIG. 12 is a wiring diagram of a stator winding on a stator core according to the sixth embodiment of the present invention.

Further, in the first embodiment, the turn portions 231c and 232c are axially stacked each other. However it can be changed into a parallel arrangement as same as the coil end of the joining side without stacking. For instance, conductor segments 123 shown in FIG. 11 may be used. The wiring specification shown in FIG. 12 will be described. In this embodiment, joints 127 are provided by a joined end of each segments 123, and a reverse portion 331 is located as a specific shaped segment. Therefore, it is possible to dispose four electric conductors per one slot. Further, it is possible to improve the cooling efficiency by forming cooling wind passages between conductors at the coil ends. Accordingly, further output variety can be added by suppressing the output reduction.

Figure 13:
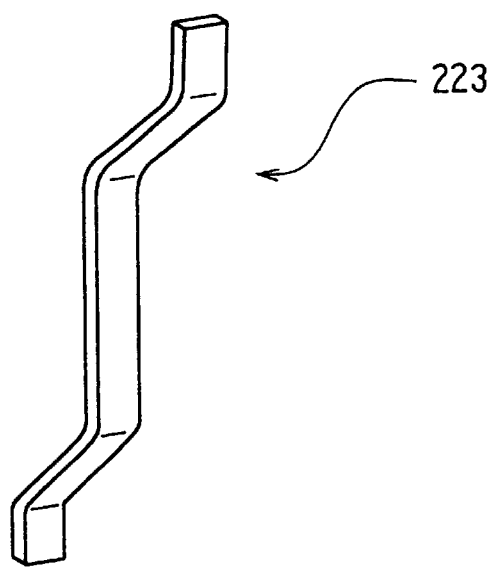
FIG. 13 is a perspective view of a conductor segment according to a seventh embodiment of the present invention.

Further, as shown in FIG. 13, the conductor segments 223 having substantially S-shape may be used. In this embodiment, a winding is formed by joining the ends of the conductor segments 223 at both ends. It is possible to improve a cooling efficiency by forming cooling wind passages between the conductors at the coil ends similar to the U-shaped conductor segments.

Additionally, the number of the conductors per one slot is four in the first embodiment, but it may be another even numbers more than 6. In this case, it is possible to provide a similar arrangement of the conductors and the joining construction.

Therefore, it is possible to increase the output varieties and to improve the cooling efficiency by enabling to flow in the coil ends and the empty slots.

Further, in the above-mentioned embodiments, several types of the conductor segments are used to form the stator winding, but the stator winding may be formed by the continuous wire. In this case, the joining process can be eliminated. As a result, it is not necessary to adjust the manufacturing process to adapt differences between the number of the joints on a plurality of types of the stator windings. Therefore, it is possible to suppress changes on the manufacturing equipment when it is required to expand the output varieties.

Further, in the first embodiment, two cooling fans in the generator are used for sending wind through the slots 250 in the axial direction, but it is possible to realize wind flow axially in the slots 250 by disposing a cooling fan on an outside of the frame to send wind throughout the inside of the frame. Further, water may be used as the cooling medium.

Further, it is possible to adopt the construction with narrowed distances between conductors by increasing the angle of inclination of the conductor segments at the coil ends. This construction provides reduction of the axial height of the coil ends. Additionally, this construction prevents wind between conductors at coil ends. Each winding of the three phase windings are cooled evenly even on the construction which is not permit cooling wind to flow through the coil ends.

An eighth embodiment is explained hereinafter with reference to the FIG. 14 and FIG. 15. In the eighth embodiment, three types of slots are disposed. First slots are the unused slots 250 in which no electric conductors are accommodated. Second slots are the used slots 25 in which electric conductors are accommodated in all layers. Next slots are half-used slots 255 in which a part of the layers are remained as a unused layers. In the eighth embodiment only two electric conductors are disposed in the half-used slots 255. Four slots of twelve slots are used as the half-used slots 255, which comprise a slots group, evenly located on the stator core 22. The remaining eight slots are the unused slots 250. Then, the electric conductors in the half-used slots 255 directly connect to the electric conductors in the adjacent used slot 25.

Figure 14:
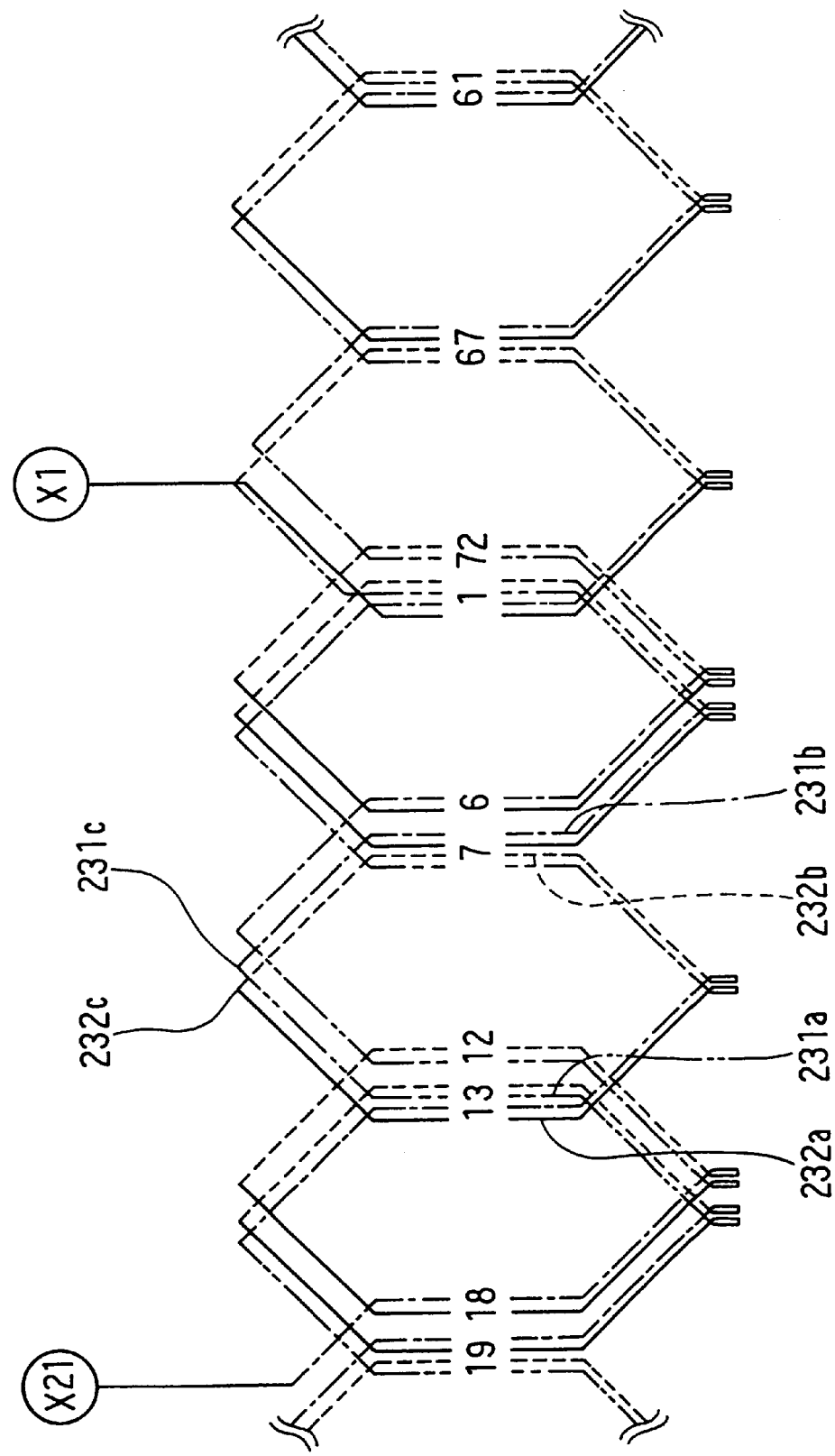
FIG. 14 is a wiring diagram of a stator winding on a stator core according to an eighth embodiment of the present invention.

An arrangement of the X phase winding is shown in FIG. 14. The used slots 25 accommodating the X phase winding are represented by slot number 1+6n(n=0 to 11). The half-used slots 255 constitute only slots #72, #6, #12 and #18 which are adjacent to the slots #1, #7, #13 and #19 of the used slots 25. Additionally, specific-shaped segments provide a connection from slot #67 to slot #72, and ends extended as leads X1 and X21. Then, a part of the plurality of slots, which are disposed adjacent to the used slots 25, may be served as the half-used slots 255.

Figure 15:
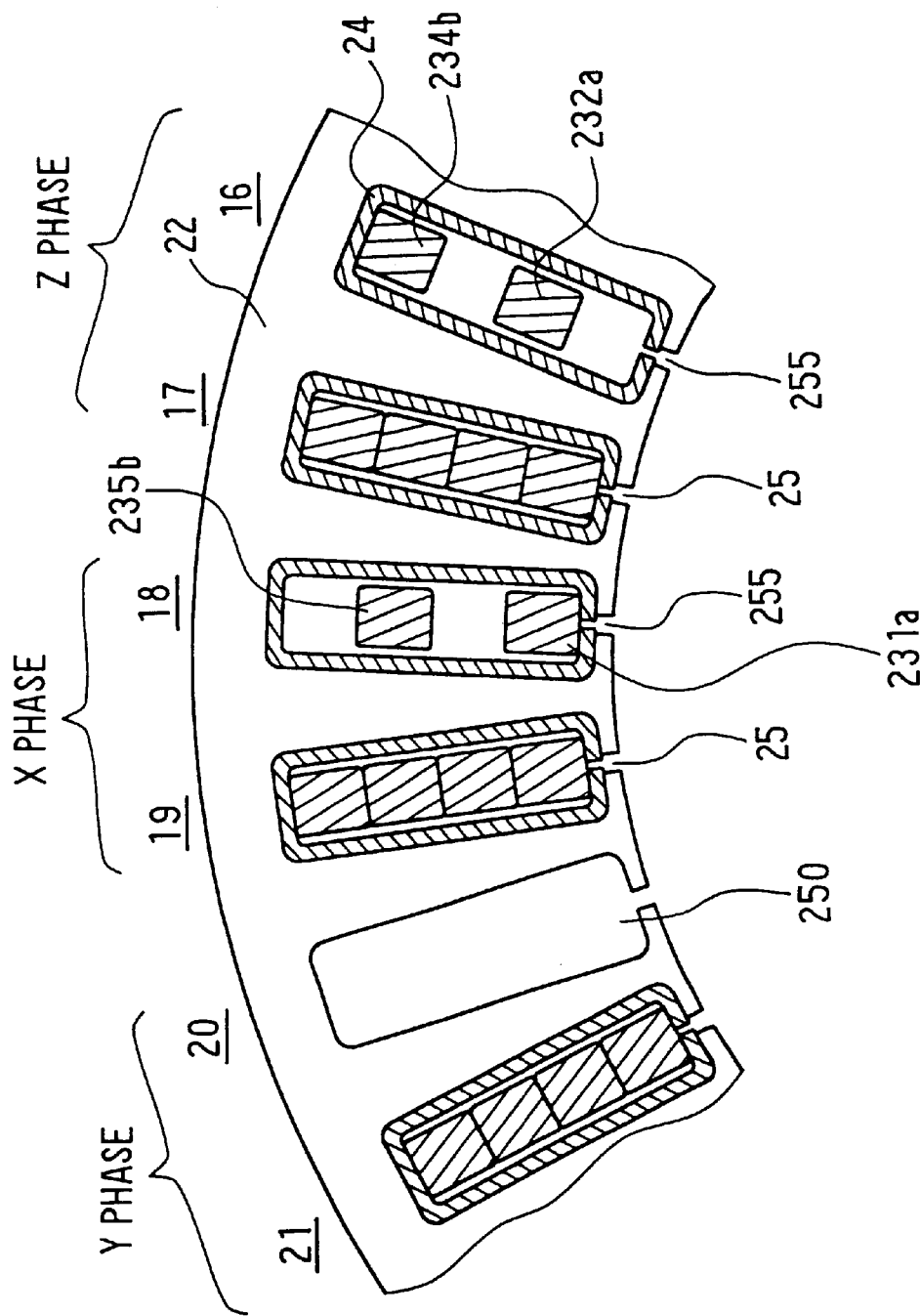
FIG. 15 is a sectional view of a part of a stator according to a ninth embodiment of the present invention.

FIG. 15 is a part of the cross sectional view of the stator core formed by the winding diagram shown in FIG. 14. In the half-used slots 255, only two layers of four layers (the inner most layer, the inner middle layer, the outer middle layer and the outer most layer) are used. The remaining two layers are the unused layers (empty layer). For instance, in the slot 255 represented #18 which is adjacent to the slot #19, the inner most layer and the outer middle layer accommodate the electric conductors 231*a* and 235*b*, but the inner middle layer and the outer most layer are the unused layer.

The Y phase and the Z phase are constructed in the same manner. Only four slots 255 of the adjacent slots, which are adjacent to the used slots 25 in X phase, Y phase and Z phase respectively, accommodates the electric conductors forming the stator winding 21. In this embodiment, 36 slots, where is half of 72 slots, are used as the used slots 25. Only 12 slots 255 of 36 slots accommodate the electric conductors partially. Further, remaining 24 slots 250 are served as the unused slots in which no electric conductors are accommodated. In this embodiment, it is possible to achieve an average number of the accommodated electric conductors per one slot which is about 4.7 (=4+($\frac{4}{12}$*2)). Therefore, it is possible to supply a new output variety. Additionally, according to the unused layer, it is possible to improve a cooling efficiency of the stator winding 21 by flowing a cooling wind through the axial direction.

Further, the unused layers may be plugged by the plugging member made of an insulating resinous material or the like. As a result, it is possible to decrease the magnetic noise generated by vibrating the stator winding 21 during a generation, because the rigidity of the stator can be increased in this case.

Generally, the winding number per one slot T is expressed by T=X+(m/P·y) where m≦P. In this expression, the number of the winding filling the slots 25 relative to the winding per a phase is taken as x. The number of N and S magnetic poles of the rotor 3 is taken as P. The number of the half-used slots in which the electric conductors are partly accommodated is taken as m. The number of electric conductors accommodated in the half-used slots 255 is taken as y.

Figure 16:
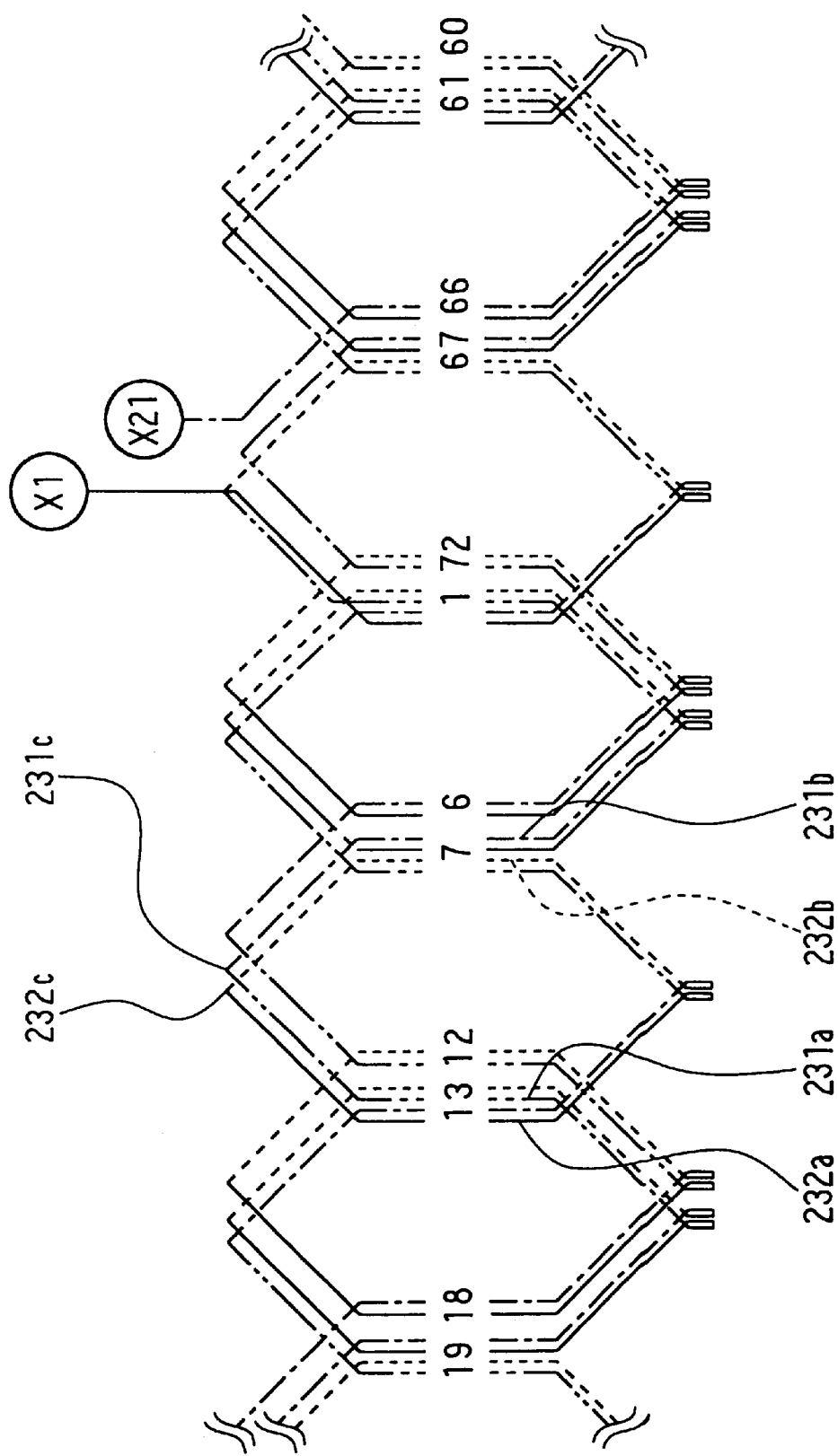
FIG. 16 is a wiring diagram of a stator winding on a stator core according to the ninth embodiment of the present invention.

For instance, the winding diagram, m=P, y=2 and x=4, is shown on FIG. 16. In this case, the number of the winding per one slot T is 6.

Figure 17:
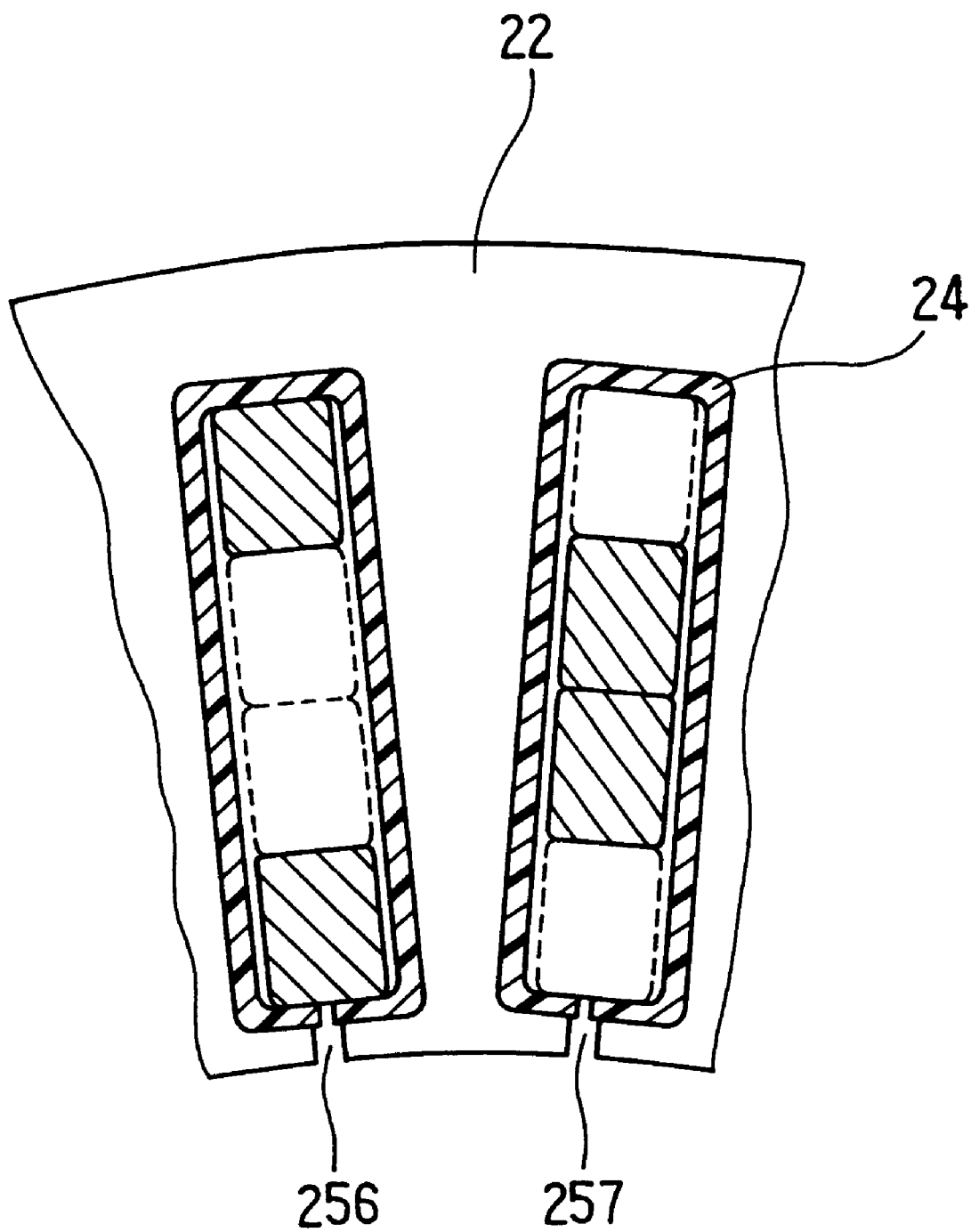
FIG. 17 is a sectional view of a part of a stator according to a tenth embodiment of the present invention.
Figure 18:
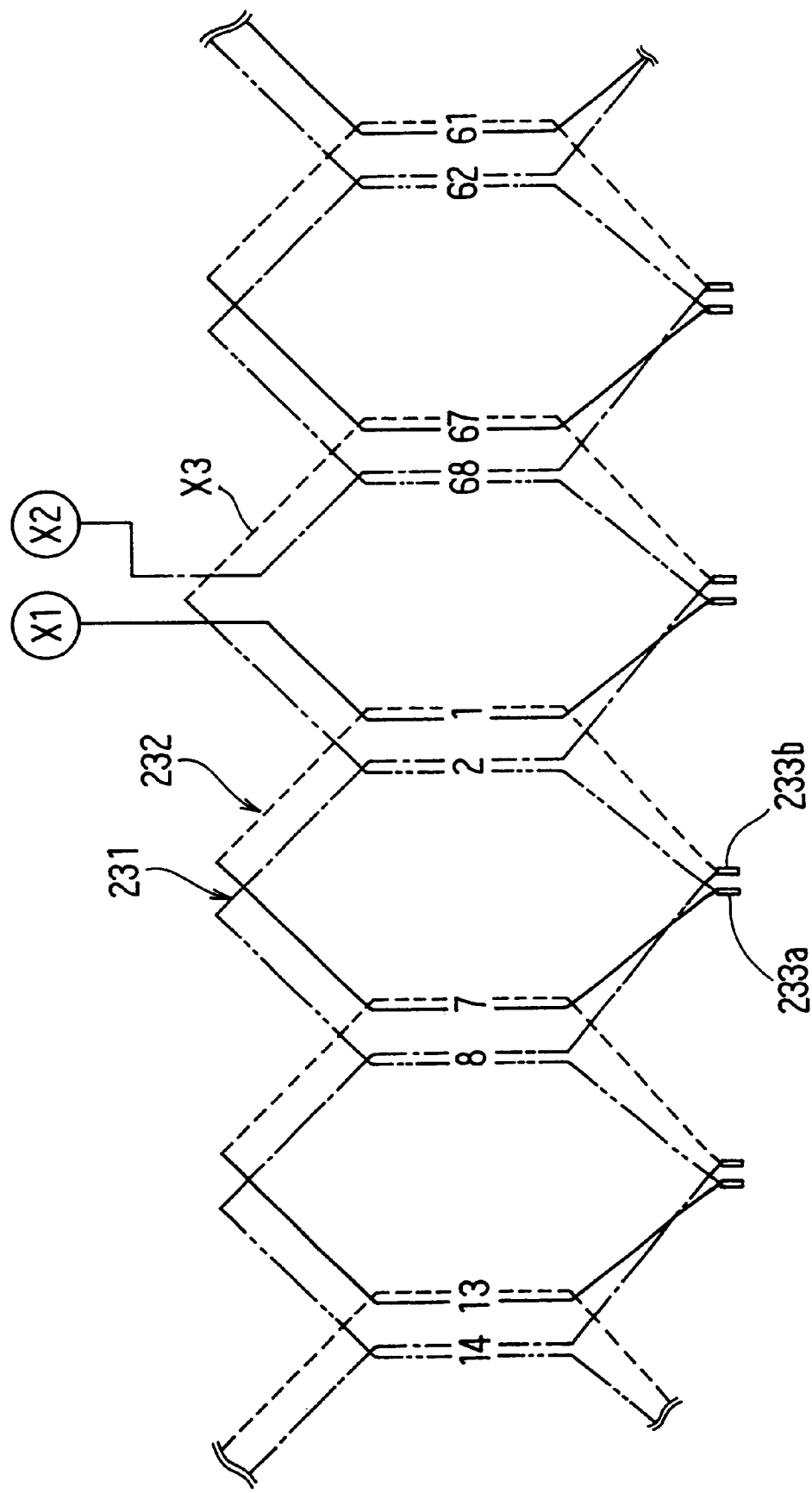
FIG. 18 is a sectional view of a part of a stator according to the tenth embodiment of the present invention.

A tenth embodiment explained hereafter with reference to the FIG. 17 and FIG. 18. In this embodiment, variables are set as m=P, y=2 and x=2. Two electric conductors are accommodated in each slots. Further, the electric conductors in two adjacent paired slots are series connected by lap-winding method. The electric conductors accommodated in the slots are series connected to form one phase winding of the stator winding. In this embodiment, the three-phase winding is provided as the poly-phase winding. All of the slots are the half-used slots. In the slots 256, the outer most layer closed to the outer most side in the radial direction and the inner most layer closed to the inner most side in the radial direction accommodate the electric conductors. The outer middle layer and the inner middle layer are remained as the unused layers. In the slots 257, the outer middle layer and the inner middle layer closed to a center in the radial direction accommodate the electric conductors. The outer most layer and the innermost layer are remained as the unused layers. The slots 256 and 257 having above-mentioned two types of arrangements are disposed alternately around the circumference of the stator core.

In this embodiment, the electric conductors are provided by a plurality of conductor segments. Two types of conductor segments are positioned as the base segments, and the specific shaped segments are positioned to provide the lead wires. Two lead segments X1 and X2, and jumper segment X3 is used as the specific shaped segments. Then, these conductor segments form the coil ends on both sides of the stator core. The turn portion of the respective conductor segments are disposed on the first coil end, and the end portions of the respective conductor segments are disposed on the second coil end. The inner joints 233*a* and the outer joints 233*b* are formed at the second coil end. The inner joints 233*a* connect the end portions of the conductor segments extended from the inner most layers and the end portions of the conductor segments extended from the inner middle layers. The outer joints 233*b* connect the end portions of the conductor segments extended from the outer most layers and the end portions of the conductor segments extended from the outer middle layers. Further, a plurality of the outer joints are disposed on a ring, and the inner joints are disposed on a ring. Further, the positions of the respective conductor segments in the slots are not important relatively. In this embodiment, it is important that the ends portions of the respective conductor segments form the four layers to provide a plurality of the joints 233a and 233b on the second coil end. This construction is effective to share the stator core with the stator winding in which the electric conductors are accommodated in all layers. This construction is also effective to suppress a change of the manufacturing equipment and process. In this embodiment, the positions of the electric conductors in the slot can move from the position as shown in FIG. 17, for instance there is a possibility to shift radial sides.

FIG. 18 is a wiring diagram showing a winding diagram of the tenth embodiment. FIG. 18 only shows an X phase of three phases located as the poly-phase winding. The Y phase and Z phase are constructed same manner. The base segments include large segments 231 used as the first segments and the small segments 232 used as the second segments. The two parallel straight portions of the conductor segments 231 and 232 are accommodated in two slots spaced apart from a predetermined magnetic pole pitch respectively. The large segments 231 have an adaptive shape to be disposed in the outer most layers and the inner most layers. The small segments 232 have an adaptive shape to be disposed in the outer middle layers and the inner middle layers. The plural conductor segments are accommodated in the two slots spaced apart 6 slots corresponding to the magnetic pole pitch. For instance, the small segments 232 are accommodated in the slot #1 and the slot #7 which form slots 257. The large segments 231 are accommodated in the slot #2 and the slot #8 which form slots 256. The construction, disposing the two types of the conductor segments alternately in the adjacent slots, is formed around the circumference of the stator core.

The inner joints 233a are formed by joining the ends of the large segments 231 extended from the inner most layers and the ends of the small segments 232 extended from the inner middle layers. Therefore, the inner joints 233a connect the conductor segments spaced apart five slots which is one slot shorter than six slots located as one magnetic pole pitch. The outer joints 233b connect the conductor segments spaced apart seven slots which is one slot longer than six slots located as one magnetic pole pitch. These joints 233a and 233b are located on the same height from the stator core. As a result, the phase winding is the lap winding. For instance, the lap winding is formed by the electric conductors accommodated in the following sequence #2-#8-#13-#7-#14 . . . Accordingly, the lap windings divided and located in the adjacent two slots are formed.

According to this embodiment, it is possible to divide the electric conductors in the all slots evenly. Additionally, it is possible to dispose the plural joints regularly.

In the manufacturing process of the vehicle AC generator, it is possible to adopt a manufacturing method. The method includes a step for selecting a stator winding form the stator winding of the present invention and the stator winding shown in FIG. 6. Further, the method includes a step for positioning the selected stator winding on the common shaped stator core. Thus, it is possible to manufacture two types of the vehicle AC generators under sharing the stator core without significant changes on the manufacturing process.

Figure 19:
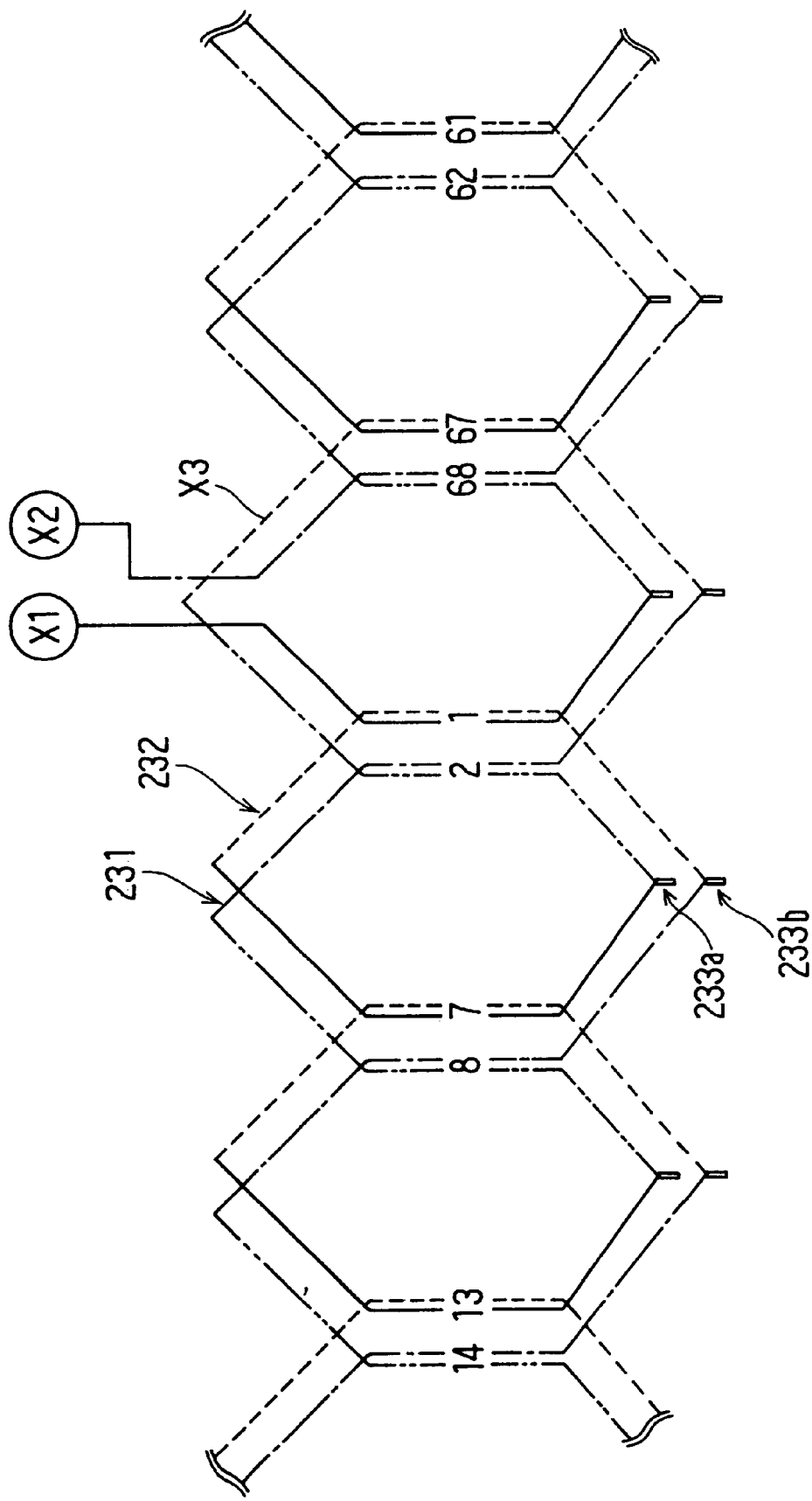
FIG. 19 is a wiring diagram of a stator winding on a stator core according to an eleventh embodiment of the present invention.

The construction shown in FIG. 19 may be adopted instead of the construction shown in FIG. 18. This modification has a different arrangement of the plural joints 233a and 233b. The outer joints 233b is located apart axially from the stator core relative to the inner joints 233a. It is possible to be even the inclination angle of the electric conductors extending towards the respective joint 233a and 233b. This construction provides an advantageous manufacturing process and an improved permeability of wind in the coil ends.

Figure 20:
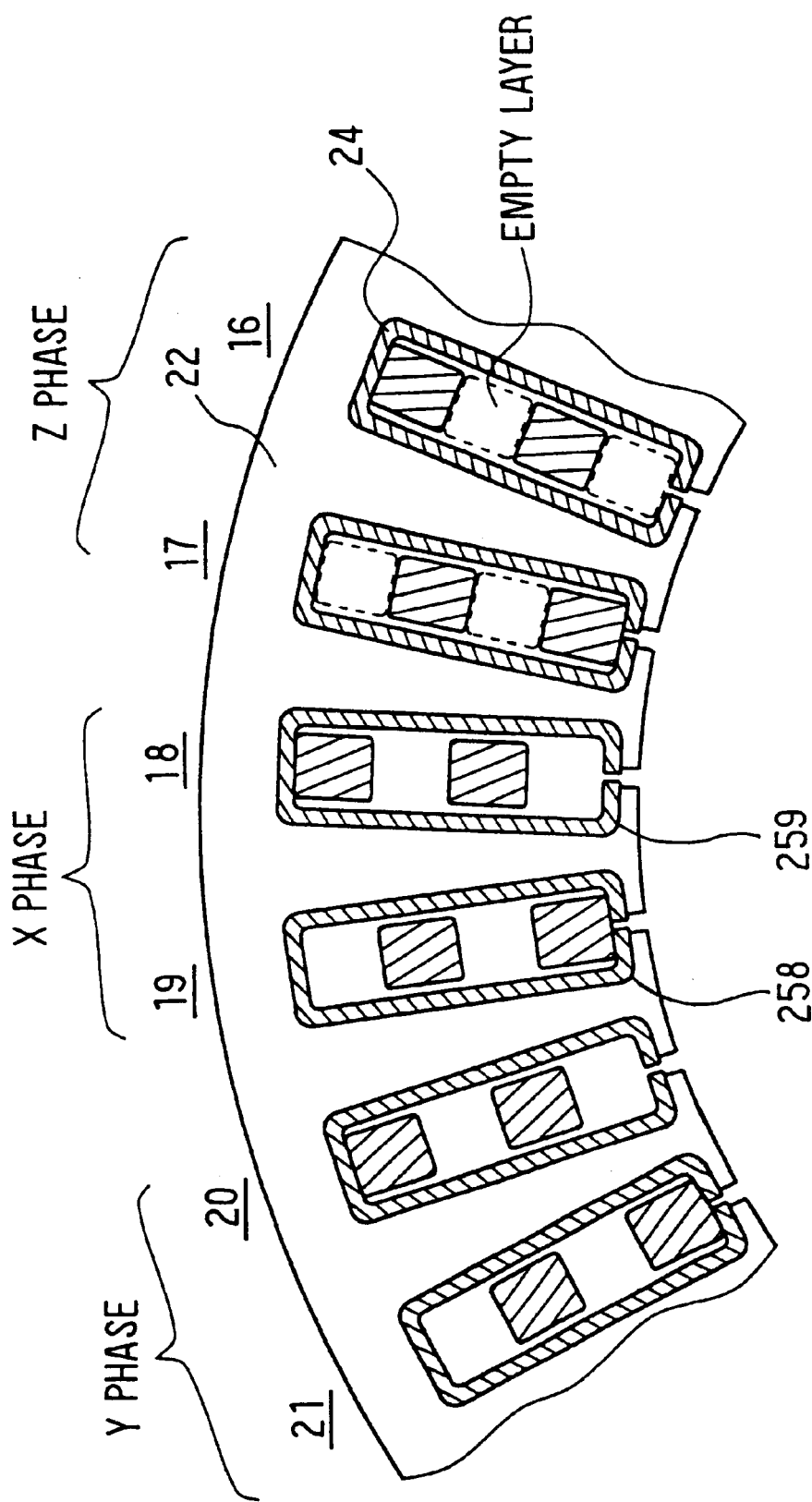
FIG. 20 is a sectional view of a part of a stator according to a twelfth embodiment of the present invention.

In the tenth embodiment, the turn portions 231c of the large segments 231 and the turn portions 232c of the small segments 232 can be located on the same height with respect to the axial direction. Further, an inverted construction with respect to the radial inside and outside shown in FIG. 18 and FIG. 19 may be adopted. Further, an arrangement shown in FIG. 20 may be adopted instead of FIG. 17. In this arrangement, all slots are half-used slots 258 and 259. The half-used slots 258 accommodates the electric conductors in the inner most layer and the outer middle layer. The half-used slots 259 accommodate the electric conductors in the outer most layer and the inner middle layer. The slots 258 and the slots 259 are disposed alternately.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A rotary electric machine comprising:
a stator core having a plurality of slots;
a poly-phase stator winding positioned on said stator core; and
a rotor,
wherein said stator winding has a cross section to be disposed in said slots and to form a plurality of layers in said slots, and
wherein said plurality of slots includes occupied slots and at least one unused slot, and
wherein at least one space vacant layer is located in the occupied slots.

2. A rotary electric machine according to claim 1, wherein said unused slot and said unused layer opens in an axial direction.

3. A rotary electric machine according to claim 1, further comprising a plugging member disposed to plug an axial end of said unused slot and said unused layer.

4. A rotary electric machine according to claim 1, further comprising a plurality of unused slots and a plurality of slots in which the stator winding is accommodated which are alternately disposed on said stator core.

5. A rotary electric machine according to claim 1, further comprising a plurality of unused layers, wherein said slots have at least first and second layers therein, one of said unused layers is located on said first layer in a first slot of said slots, and another of said unused layers is located on said second layer in a second slot of said slots.

6. A rotary electric machine according to claim 5, further comprising a plurality of said first slots and a plurality of said second slots, wherein said first and second slots are alternately disposed on said stator core.

7. A rotary electric machine according to claim 1, wherein said stator winding has a plurality of conductor segments which are joined at ends to form a plurality of joints, and said plurality of joints are arranged in multiple rings at one end of said stator core.

8. A rotary electric machine according to claim 1, wherein said stator winding has a plurality of U-shaped conductor segments which are joined at ends thereon, and said U-shaped conductor segments includes first U-shaped conductor segments and second U-shaped conductor segments which have different sizes corresponding to a position in said slots.

9. A rotary electric machine according to claim 8, wherein said first U-shaped conductor segments are disposed adjacent to a radial ends in said slots, and said second U-shaped conductor segments are disposed adjacent to a radial center in said slots.

10. A rotary electric machine comprising:

a stator core having a plurality of slots;

a ploy-phase stator winding positioned on said stator core; and a rotor, wherein said stator winding has a plurality of U-shaped conductor segments joined each to other at the ends thereon, wherein each of said U-shaped conductor segments has both ends located on one side of said stator core and a turn portion located on another side of said stator core, wherein said U-shaped conductor segments include first U-shaped conductor segments and second U-shaped conductor segments, said both ends of said first U-shaped conductor segments are disposed on an outer most layer and an inner most layer at said one side of said stator core, said both ends of said second U-shaped conductor segments are disposed on an outer middle layer and an inner middle layer at said one side of said stator core, wherein each of said plurality of slots has one of said first and second U-shaped conductor segments such that the first and second U-shaped conductor segments are alternately disposed on said plurality of slots with respect to a circumferential direction, wherein said outermost layers and said outer middle layers are joined to form a plurality of joints arranged in a ring, and p1 wherein said innermost layers and said inner middle layers are joined to form a plurality of joints arranged in a ring.

11. A rotary electric machine according to claim 10, wherein said first U-shaped conductor segments are disposed adjacent to a radial ends in said slots, and said second U-shaped conductor segments are disposed adjacent to a radial center in said slots.

12. A rotary electric machine comprising:

a rotor providing N and S magnetic poles alternately along a rotational direction;

a stator having a stator core disposed opposite to said rotor and a poly-phase stator winding positioned on said stator core, wherein said stator core has a laminated core formed with a plurality of slots extending to penetrate laminated sheets of said laminated core, wherein said slots include a first slot in which said stator winding is disposed and a second slot in which said stator winding is not disposed, and wherein a plurality of said first slots and second slots are disposed alternately along a circumferential direction of said stator core.

13. A rotary electric machine according to claim 12, wherein said second slot has an opening.

14. A rotary electric machine according to claim 12, further comprising a plugging member disposed to plug an inside opening of said second slot.

15. A rotary electric machine according to claim 12, wherein said stator winding includes a plurality of conductor segments, wherein said conductor segments are disposed in said slots and insulated each other to form a plurality of layers with respect to a depth direction, wherein each of said conductor segments has partial portions extending from both axial sides of said slots, wherein said partial portions of said conductor segment forms a coil end connecting in series between different layers in two of said slots which are spaced apart from each other corresponding to an N and S magnetic pole pitch on said rotor, and wherein a plurality of said coil ends are disposed to form gaps in which a cooling medium flows.

16. A rotary electric machine according to claim 12, wherein said stator winding in said slot s has a cross section similar to a rectangular shape corresponding to a shape of said slot.

17. A rotary electric machine according to claim 12, wherein said second slot is closed at a radial inside of said stator core.

18. A rotary electric machine according to claim 12, wherein said first slot and said second slot has different widths along a circumferential direction respectively.

* * * * *